United States Patent [19]
Martin et al.

[11] 4,104,486
[45] Aug. 1, 1978

[54] SYSTEM FOR ACCUMULATING DATA OVER NONDEDICATED TELEPHONE LINES

[76] Inventors: John R. Martin, 3129 W. Mill Rd., Milwaukee, Wis. 53209; Robert S. Block, 777 W. Glencoe Pl., Milwaukee, Wis. 53217

[21] Appl. No.: 701,033
[22] Filed: Jun. 29, 1976
[51] Int. Cl.² .................... H04Q 9/00; H04M 11/00
[52] U.S. Cl. .................... 179/2 AM; 340/150
[58] Field of Search .................. 179/2 AM, 2 A, 5 P, 179/2 AS; 340/150, 151, 147 R

[56] References Cited
U.S. PATENT DOCUMENTS

| | | | |
|---|---|---|---|
| 2,833,859 | 5/1958 | Rahmel et al. | 179/2 AS |
| 3,376,389 | 4/1968 | Fair | 179/2 AM |
| 3,390,234 | 6/1968 | Glidden | 179/2 AM |
| 3,427,402 | 2/1969 | Stokes | 179/5 P |
| 3,842,206 | 10/1974 | Barsellotti et al. | 179/2 AM |
| 3,899,639 | 8/1975 | Cleveley et al. | 179/2 AM |
| 3,922,492 | 11/1975 | Lumsden | 179/2 AM |
| 3,975,589 | 8/1976 | Ebner et al. | 179/2 AM |

*Primary Examiner*—Thomas A. Robinson
*Attorney, Agent, or Firm*—Burns, Doane, Swecker & Mathis

[57] ABSTRACT

A telephone data accumulator system for accumulating data at a central station through connection of the central station to a remote subscriber's station, including a data accumulator, by way of nondedicated telephone lines. The remote terminal is selectively conditioned to generate dialing signals and to thereby provide selective connection of the accumulator to the telephone lines from the remote subscriber station. A preconditioning circuit such as timing means or a broadcast signal decoder at the subscriber's station conditions the remote terminal and provides a short time window during a time of the day when the telephone there is not likely to be used for normal telephone calls, and the call is made to the central station during the time window to cause connection of the data accumulator to the telephone lines. The data in the data accumulator is thereafter transferred from the remote station to the central station over the telephone lines.

6 Claims, 4 Drawing Figures

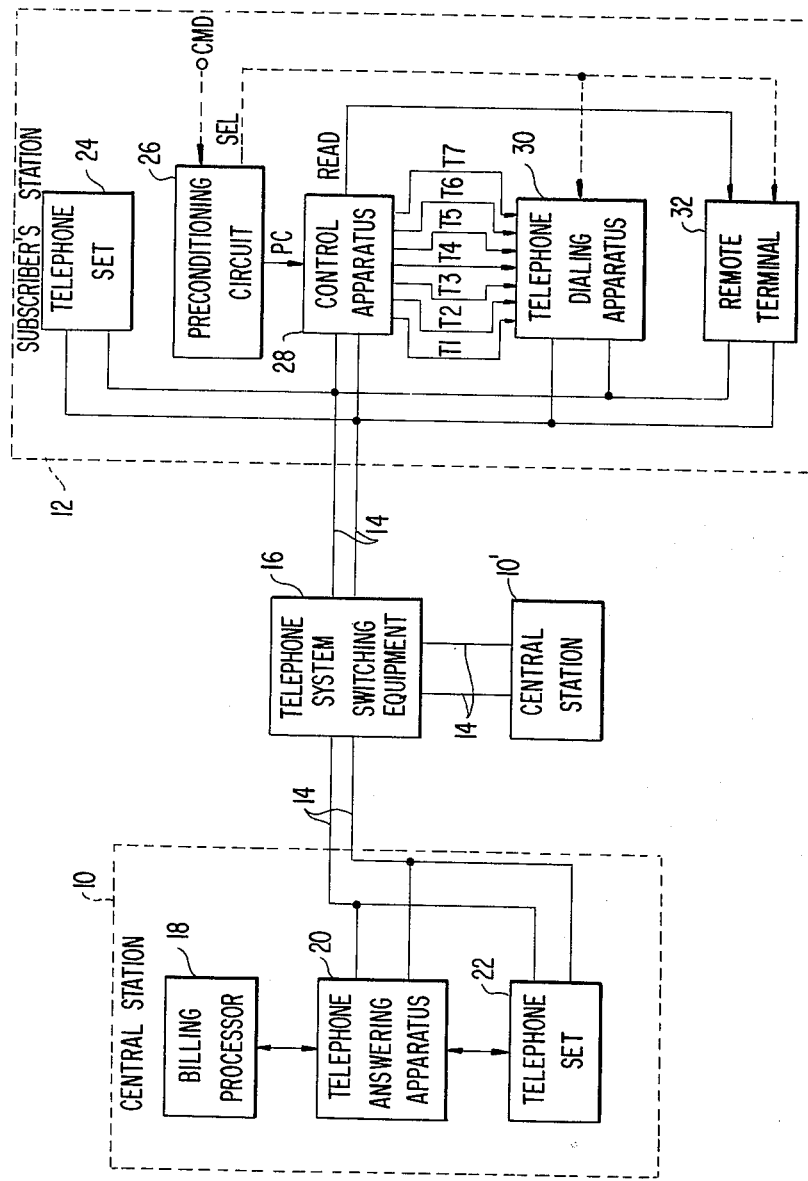
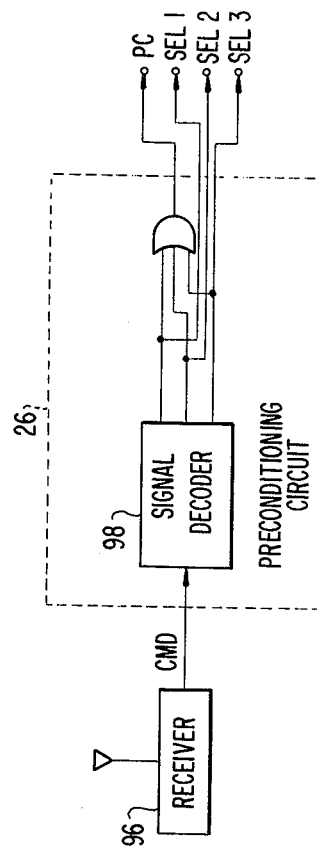

SYSTEM FOR ACCUMULATING DATA OVER NONDEDICATED TELEPHONE LINES

BACKGROUND OF THE INVENTION

The present invention relates to a system for connecting a central station through a telephone switching system to a remote terminal that is associated with a particular nondedicated subscriber telephone line. The remote terminal, as discussed hereinafter, may be considered as a data accumulator. However, it will be recognized that certain aspects of the present invention have application for other uses such as, for example, surveillance of the premises.

A number of services provided in homes or other diverse locations require the reading of a meter or other data accumulator on a periodic basis in order to bill the customer for the services. Similarly, data relating to a condition such as that of an alarm on the premises may require periodic monitoring.

The accumulation of data or the periodic monitoring of conditions at a large number of diversely spaced locations may be a time consuming and expensive job if accomplished by traveling to each location. It is thus desirable to accumulate such data at a central location without the necessity of traveling to each location and with a minimum of human intervention.

One of the more desirable ways of providing communication between a central station and a remote station is via nondedicated telephone lines that provide normal telephone service to the remote station. Nondedicated lines are available at most locations but for successful use of such lines the access system should be capable of connecting the central and remote stations without disturbing the customer at the remote location or disrupting normal telephone service.

In one form of the invention, a data accumulator is provided at the subscriber's station for registering the sum of services used or for detecting a condition at the subscriber's station. These services may constitute viewing of pay television programs or of programs from cable television. Also, the system might be used for reading water, gas and electric meters, etc., or for noting security conditions on the premises.

A central computer or billing processor may be provided at the central or control station for periodically, as once per month, reading the information in the accumulator. The periodic reading is accomplished by the central computer over the telephone lines to the subscriber's station. The connection between the computer and the accumulator is effected by automatic dialing equipment at the remote subscriber's station under the control of a preconditioning circuit that generates dialing signals in response to a timer or broadcast signal decoder or the like. As will be seen hereinafter, the connection is effected without disturbing the customer or otherwise disrupting normal telephone service.

The principles embodied in the system may also be used to monitor a subscriber's home or place of business for noises indicative of the presence of intruders when the premises are otherwise unoccupied. In that case, a microphone arrangement would be used instead of a data accumulator. Also, the telephone calls would preferably be initiated by the remote station in response to detected noise or on a relatively short time basis, e.g., 15 minutes between calls.

It is accordingly an object of the invention to provide an improved novel method and apparatus for remote reading of information over nondedicated telephone lines by initiating calls from the remote location.

Another object is to provide a novel and improved method and apparatus for remote reading of a data accumulator over nondedicated telephone lines wherein the accumulator provides information as to the amount of service used by a subscriber to the service for billing purposes and the connection between stations is initiated by a preconditioning and telephone dialing circuit at the remote location.

A further object of the invention is to provide a novel method and apparatus whereby a central station associated with a particular provider of services, such as a pay or cable television system operator, can periodically read a data accumulator device located at the subscriber's station over commercially installed, nondedicated telephone lines connecting the stations to telephone switching equipment so as to facilitate the determination of the amount of the services used by the subscriber without the need for dialing from the central station and thus with a saving of computer time.

Yet another object of the invention is to provide a novel method and apparatus as referred to in the object immediately preceding in which the interchange of information between the data accumulator and the central station is made through the use of commercially installed, nondedicated telephone lines without disturbing the subscriber or disrupting normal telephone service.

These and other objects of the invention will become more fully apparent from the claims, and from the description as it proceeds in conjunction with the appended drawings.

BRIEF DESCRIPTION OF THE DRAWINGS

FIG. 1 is a functional block diagram of a preferred form of the invention;

DETAILED DESCRIPTION

Figure 2:
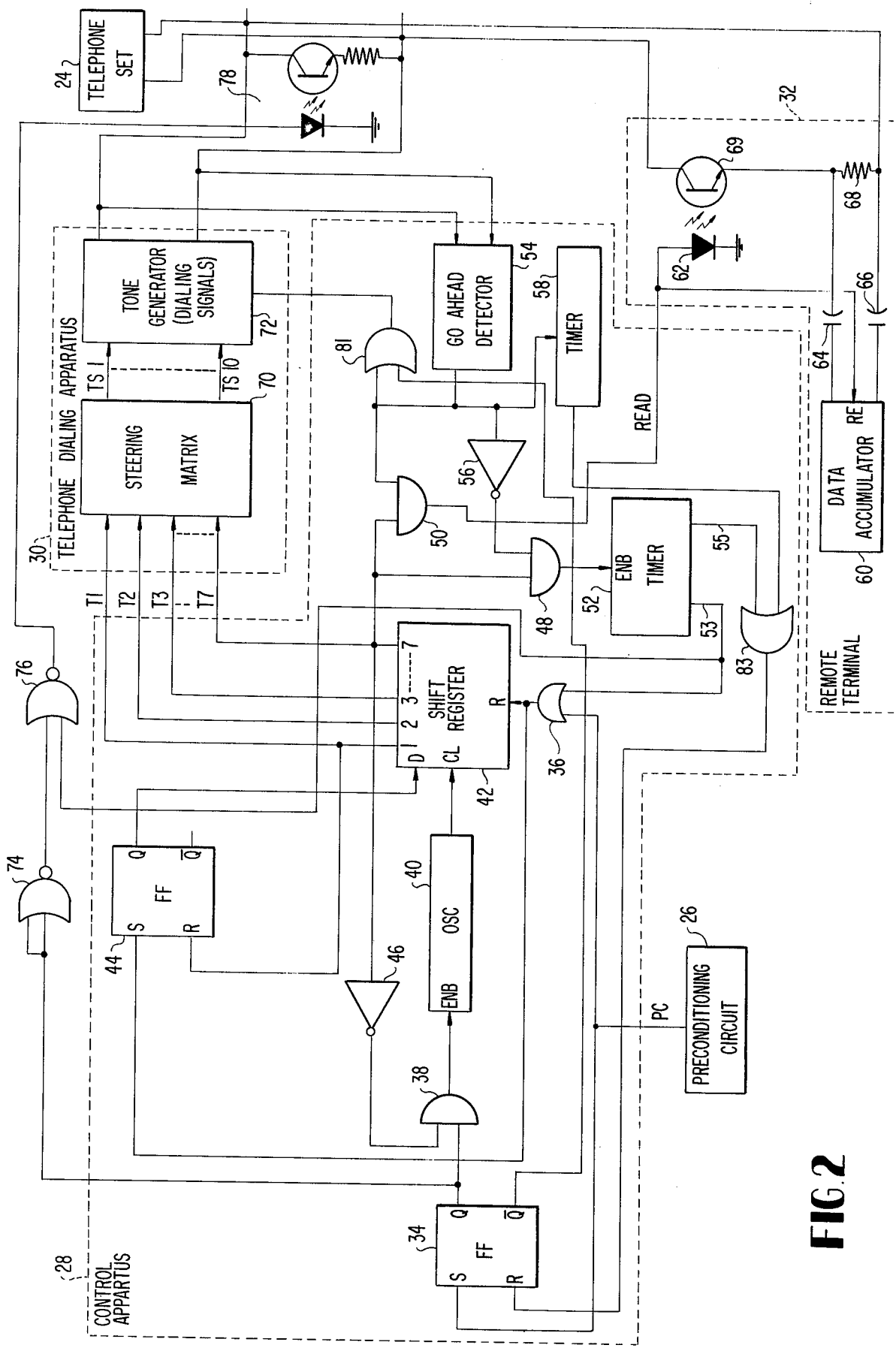
FIG. 2 is a schematic diagram illustrating in greater detail the embodiment of the invention of FIG. 1.

FIG. 1 illustrates a system according to the invention in which a telephone call to connect a billing processor to a remote terminal or data accumulator is made to a central station 10 from the subscriber's station 12 by way of non-dedicated telephone lines 14. The connection between the two stations is effected through commercially installed telephone system switching equipment 16 by conventional dialing signals produced at the subscriber's station 12 as will hereinafter be described in detail.

The central station 10 includes a billing processor 18, a telephone answering apparatus 20 and a telephone station or set 22. The receipt of a subscriber's call at the telephone set 22 operates in a conventional manner through the call answering apparatus 20 to connect the billing processor 18 to the telephone lines 14. The billing processor 18 then operates in a conventional manner to identify the subscriber and receive the information from the subscriber's remote terminal or data accumulator. Additional central stations such as the station 10' may also be provided to receive data from the subscriber's station 12.

The subscriber's station 12 includes a telephone set 24 and a preconditioning circuit 26 which conditions control apparatus 28 to operate telephone dialing apparatus 30 to make connection of a remote terminal or data accumulator 32 with the central station 10. In this connection, the control apparatus 28, the telephone dialing apparatus 30 and the remote terminal 32 are connected across (i.e., in parallel with) the non-dedicated telephone lines 14 which are installed to the telephone set 24. The preconditioning circuit 26 provides a precondition signal PC to the control apparatus 28 and, as will be described hereinafter in detail, may also supply data selection signals SEL to the telephone dialing apparatus 30 and to the remote terminal 32. The control apparatus supplies a READ signal to the remote terminal 32 and also supplies timed trigger signals T1-T7 to the dialing apparatus 30.

In operation, the system of FIG. 1 permits normal operation of the subscriber's telephone 24. The telephone set 24 will be unavailable for normal calling operation only during the few seconds in a billing period that the control apparatus 28 places the remote terminal 32 in communication with the central station 10.

As will be described hereinafter in greater detail, the preconditioning circuit 26 triggers or enables the operation of the control apparatus 28 periodically either on a timed basis (e.g., once a month at a time when the telephone set is not normally in use) or upon receipt of some externally applied command signal CMD as illustrated in phantom. The control apparatus 28 supplies the trigger signals T1-T7 to operate the telephone dialing apparatus 30 and place a call to a selected one of the central stations 10 and 10'.

The call is placed by the telephone dialing apparatus 30 under the control of the control apparatus 28 by applying a conventional "dialing" signal (e.g., an interrupter type dial signal or a multi-tone signal) to the telephone lines. The "dialing" signals are received by the telephone switching equipment 16. The call is routed to the appropriate central station by the telephone switching equipment 16 placing a "ringing" signal on the appropriate non-dedicated lines 14 and the call is answered automatically in a conventional manner by the answering apparatus 20. A "go ahead" signal is then placed on the telephone lines 14 leading to the subscriber's station 12 to indicate that the call has been answered. The billing processor 18 may also place an encoded "go ahead" signal on the lines 14 so as to provide a "go ahead" code unique to the billing system for detection at the subscriber's station making the call.

When the call has been answered by the answering apparatus 20 at the central station, the control apparatus 28 at the subscriber's station 12 applies the READ signal to the remote terminal 32. A data accumulator in the remote terminal is then connected across the telephone lines 14 and the data in the accumulator, together with a code unique to the calling subscriber's station, is transmitted to the central terminal 10 over the non-dedicated telephone lines. Where more than one data accumulator is provided in the remote terminal 32, the SEL signal selects the desired data accumulator and the data in that accumulator is read and transmitted to the central station. The SEL signal may also provide selectivity in placing a call to one of several central stations as will subsequently be described.

Referring now to FIG. 2 wherein one form of the present invention is illustrated in greater detail, the preconditioning circuit 26 provides the PC signal to the set input terminal S of a binary multivibrator or flip flop 34 and to one input terminal of a two input terminal OR gate 36 in the control apparatus 28. The output signal from the true or binary ONE output terminal Q of the flip flop 34 is applied to one input terminal of the two input terminal AND gate 38 and the output signal from the AND gate 38 is applied to the enable input terminal ENB of a conventional oscillator 40. The output signal from the oscillator 40 is applied to the clock input terminal CL of a conventional seven-stage shift register 42.

The output signal from the OR gate 36 is applied to the reset input terminal R of the shift register 42 and to the set input terminal S of a binary multivibrator or flip flop 44. The output signal from the true output terminal Q of the flip flop 44 is applied to the data input terminal D of the shift register 42. The output signal from the first stage of the shift register 42 is applied to the reset input terminal R of the flip flop 44 and the output signal from the seventh stage of the shift register 42 is supplied through an inverter 46 to the second input terminal of the AND gate 38. The output signal from the seventh stage of the shift register 42 is also applied to one input terminal of a two input terminal AND gate 48 and to one input terminal of a two input terminal AND gate 50.

The output signal from the AND 48 is applied to the enable input terminal of a conventional timer 52 and the output signal from the timer 52 is applied to the second input terminal of the OR gate 36. A go ahead detector 54 is connected across the nondedicated telephone lines 14 and the output signal from the detector 54 is supplied to the second input terminal of the AND gate 50, through an inverter 56 to the second input terminal of the AND gate 48 and to the trigger input terminal T of a conventional timer 58. The output signal from the timer 58 is applied to the reset input terminal R of the flip flop 34.

The AND gate 50 in the control apparatus 28 generates the READ signal which is supplied to the remote terminal 32. More specifically, the READ signal is applied from the output terminal of the AND gate 50 to the READ enable input terminal RE of a conventional data accumulator 60 (e.g., a register or other suitable memory device) and through a conventional light emitting diode 62 to ground. The output terminals of the data accumulator 60 are connected through coupling capacitors 64 and 66 to a load resistor 68. The capacitor 64-resistor 68 junction is connected through a light responsive transistor (e.g., a phototransistor) to one side of the telephone lines 14 and the capacitor 66-resistor 68 junction is connected directly to the other side of the lines 14.

The shift register 42 of the control apparatus 28 supplies the T1-T7 trigger signals to the telephone dialing apparatus 30. Specifically, the signals T1-T7 from the respective first through seventh stages of the shift register 42 are supplied to a conventional steering matrix 70 in the telephone dialing apparatus 30. The steering matrix 70 supplies tone selection signals TS1-TS10 to a suitable conventional tone generator 72 and the output terminals of the tone generator 72 are connected across the telephone lines 14.

In operation, the preconditioning circuit 26 periodically generates the PC signal on a timed basis or otherwise as described hereinafter. The PC signal sets the flip flop 34, operates a line capture circuit 78 through NOR gates 74 and 76, and also sets the flip flop 44 through the OR gate 36. The setting of the flip flop 34 enables the AND gate 38, enabling the oscillator 40. The setting of flip flop 34 also enables the tone generator 72 via OR gate 81. Since the flip flop 44 is also set, a binary ONE output signal is supplied to the data input terminal D of the shift register 42 and the first clock signal from the oscillator 40 shifts the binary ONE into the first stage of the shift register 42. The flip flop 44 is thereafter reset and the binary ONE is shifted the length of the shift register 42 by the oscillator 40 output signal.

As the binary ONE signal is shifted through the register 42, the signals T1–T7 sequentially assume high and then low signal levels. The steering matrix 70 is preset to generate a predetermined sequence of tone selection signals TS1–TS10 in response to this sequential triggering so that the tone generator 72 generates a predetermined dialing signal associated with the telephone number of a particular central station. Accordingly, as the binary ONE signal is shifted along the shift register 42, the tone generator 72 places a series of dialing tones on the non-dedicated telephone lines 14 and the call is placed to the particular central station desired.

When the binary ONE signal is shifted into the seventh stage of the shift register 42, the AND gate 38 is inhibited, inhibiting the oscillator 40 and preventing further shifting of the shift register 42. The binary ONE signal in the seventh stage of the shift register 42 enables the AND gates 48 and 50 and, since a "go ahead" signal is not immediately detected by the detector 54, the timer 52 is enabled. If the timer 52 times out before a "go ahead" signal is received, a binary ONE output pulse signal is produced by the timer 52 on lead 53 and the control apparatus is reset so that a call is again placed to the central station as was previously described. The output pulse from timer 52 also momentarily disconnects line capture 78 so that the telephone switching equipment is set up to properly receive the next dialing sequence.

If the "go ahead" signal is received before the timer 52 times out, the AND gate 48 is inhibited by the signal from the go ahead detector 54 and the AND gate 50 is enabled. The tone generator 72 is disabled via OR gate 81. The timer 52 places a "stop sequence" pulse on line 55 after a predetermined number of sequences with no go-ahead signal to reset the flip flop 34 by way of the OR gate 83.

Enabling of the AND gate 50 by the signal from the go ahead detector 54 produces the READ signal which energizes the light emitting diode 62, causing the phototransistor 69 to become conductive. This effectively places the resistor 68 across the telephone lines 14. At the same time the READ signal enables the data accumulator 60 by, for example, enabling a clock signal in the data accumulator 60 to clock the accumulated data onto the telephone lines 14 through the coupling capacitors 64 and 66. The data accumulated by the accumulator 60 is thus applied to the telephone lines 14 and is transmitted to the central station over the non-dedicated telephone lines. In addition, an address signal or other coded signal is transmitted to the central station so that the data received by the central station can be associated with the transmitting subscriber station. This address signal may be permanently stored in the data accumulator and may be clocked onto the telephone lines 14 every time data is transmitted.

The timer 58 is triggered upon receipt of the "go ahead" signal by the go ahead detector 54. The timer 58 times out over a period slightly greater than the longest expected time required for emptying the data accumulator 60. When the timer 58 times out, the flip flop 34 is reset via OR gate 83 so that the control apparatus 28 is prepared for the next preconditioning signal PC supplied by the preconditioning circuit 26.

The control apparatus 28 may be arranged to seize the telephone lines 14 (i.e., provide the telephone system with an "off-hook" indication so that a call may be placed) in any suitable conventional manner other than that illustrated. For example, the signal PC from the preconditioning circuit 26 may be provided to a conventional electromechanical device which actually lifts the receiver of the telephone set 24 off the hook switch. Alternatively, the output signal from the flip flop 34 may be utilized to trigger the illustrated line capture circuit 78 or any other conventional circuit connected across the telephone lines 14 to seize the lines for placement of a call in a conventional manner.

As was previously mentioned, there may be situations where several data accumulators at the subscriber station must be read on a periodic basis. For example, an accumulator may be provided at the subscriber station for gas metering, electricity metering and/or other similar functions in addition to metering for pay television billing purposes. In such a situation, an embodiment of the invention illustrated in FIG. 3 may be utilized to read the data from the various accumulators and transmit this data to a central billing processor.

Figure 3:
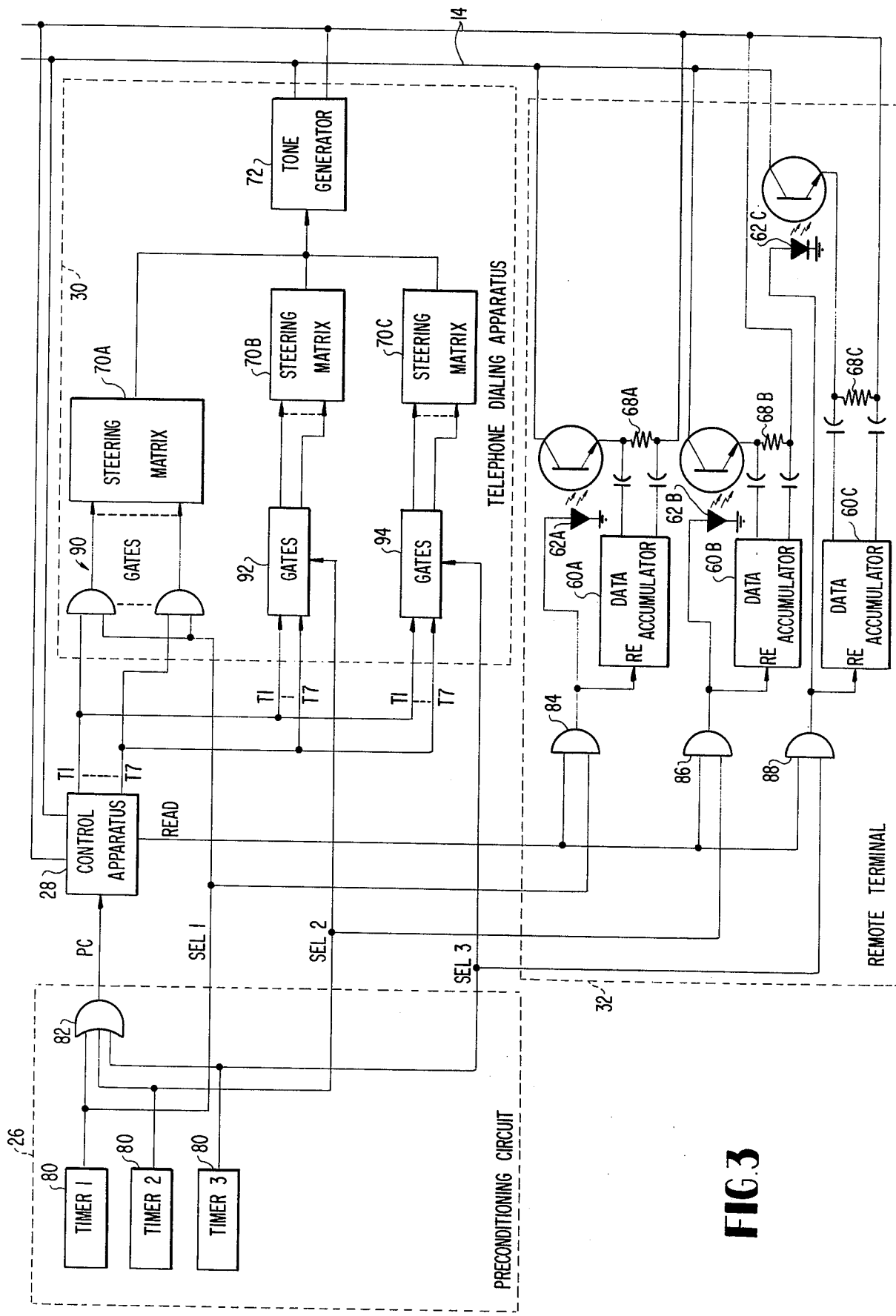
FIG. 3 is a functional block diagram illustrating one embodiment of the invention having a plurality of data accumulators selectively connectable to a central station; and, FIG. 4 is a functional block diagram illustrating another form of the preconditioning circuit of FIGS. 1-3.

Referring now to FIG. 3, the preconditioning circuit 26 of FIGS. 1 and 2 may include a plurality of conventional timers 80 each providing an output pulse at different times but on predetermined timed periodic basis (e.g., every 2 weeks or once a month). The signals from the timers 80 are supplied to the respective input terminals of a three input terminal OR gate 82 and are provided as the respective selection output signals SEL-1–SEL3 from the preconditioning circuit 26. The preconditioning signal PC from the OR gate 82 is supplied to the control apparatus 28 which may be identical to the control apparatus illustrated in FIGS. 1 and 2. In this connection, the control apparatus 28 provides the READ signal to the remote terminal 32 and provides the trigger signals T1–T7 to the telephone dialing apparatus 30.

The remote terminal 32 may contain several data accumulators so as to provide for the accumulation of data from several different sources. As illustrated, for example, the remote terminal 32 contains three data accumulators 60A, 60B, and 60C. The READ signal from the control apparatus 28 is supplied to one input terminal of each of the two input terminal AND gates 84, 86 and 88 in a remote terminal 32 and the selection signals SEL1, SEL2 and SEL3 are supplied to the second input terminal of the respective AND gates 84, 86 and 88. The output signal from the AND gate 84 is applied to the read enable input terminal RE of the data accumulator 60A and through a light emitting diode 62A to ground. Similarly, the output signals from the AND gates 86 and 88 may be applied to the read enable input terminals of associated data accumulators 60B and 60C, respectively, and to associated light emitting diodes 62B and 62C. The light emitting diodes 62A, 62B and 62C may be light coupled to associated phototransistors in series with load resistors 68A, 68B and 68C, respectively, as was previously described in connection with FIG. 2. Similarly, the data accumulators may be connected to the resistors 68A, 68B and 68C and each of these accumulator connection circuits may be connected across the telephone lines 14 as was previously described in connection with FIG. 2. Transformer coupling may be used instead of resistors 68A, B, C.

The data in the data accumulators 60A–60C may be transmitted to the same central station by dialing only a single telephone number as was previously described in connection with FIG. 2. However, it may be desirable to transmit data from different accumulators to different central stations, e.g., either the central station 10 or the central station 10' as shown in FIG. 1.

To provide access to more than one central station, the telephone dialing apparatus may include a group of AND gates and a steering matrix for each different telephone number. Specifically, the trigger signals T1–T7 from the control apparatus 28 may be applied to three groups of AND gates 90, 92 and 94. The SEL1 signal from the timer 1 may be applied to gate enable input terminals of the group of AND gates 90 and the output signals from the AND gates 90 may be applied to a steering matrix 70A. Similarly, the SEL2 and SEL3 signals from the respective timers 2 and 3 of the preconditioning circuit 26 may be applied to the groups of AND gates 92 and 94, respectively. The output signals from the AND gates 92 and 94 may be applied to the respective steering matrices 70B and 70C and the output signals from the steering matrices 70A–70C may be applied to the tone generator 72. The tone generator 72 is connected across the telephone lines 14 as was previously described.

In operation, the timers 80 periodically generate a timing pulse at different times during a billing period. The timing pulses are supplied through the OR gate 82 as the preconditioning signal PC to the control apparatus 28 to initiate the transmission of data from the remote terminal to the central station.

When the first timer 80 (i.e., timer 1) generates its periodic signal, the control apparatus 28 is preconditioned and the SEL1 signal enables the AND gate 84 and the AND gates 90. The control apparatus 28 generates the T1–T7 trigger signals and the steering matrix 70A causes the tone generator 72 to place a predetermined sequence of tones on the telephone lines 14 and thus place a call to a predetermined central station. When the connection has been made between the subscriber station and the central station as was previously described, the READ signal from the control apparatus 28 connects the data accumulator 60A across the telephone lines 14 and enables the reading of the accumulator 60A.

At some different time during the billing period, the timer 2 generates an output pulse which preconditions the control apparatus 28 and enables the AND gates 86 and 92. The T1–T7 signals from the control apparatus 28 are then passed by the AND gates 92 to the steering matrix 70B to generate a different sequence of tones and thereby connect the subscriber station to a different central station and transmit the data from the data accumulator 60B thereto. Similarly, the timer 3 generates an output pulse at a different time than either the timer 1 or timer 2 and effects the connection of the subscriber station to a central station determined by the telephone number in the steering matrix 70C so that the data accumulator 60C can be read.

It can thus be seen from the foregoing that there is data accumulated at the subscriber station can be transmitted over the nondedicated telephone lines to various billing processors. For example, the data accumulator 60A may be connected to accumulate data from a pay TV system. The data may be periodically transmitted to the pay TV system central billing processor at a first location. Similarly, the data accumulator 60B may be connected to receive data from the subscriber's watthour meter and the data accumulator 60C may be connected to receive data from the subscriber's gas meter. At different times during the billing period (e.g., during a monthly cycle), the data accumulators 60B and 60C may be connected to respective billing processors at the electrical power company and the gas company through operation of the steering matrices 70B and 70C, respectively.

As an alternative to the use of timers in the preconditioning circuit 26 as was described in connection with FIG. 3, the preconditioning circuit 26 may receive an external command signal CMD as was mentioned in connection with FIG. 1. For example, the subscriber's television receiver may be connected so that a portion of the received signal is supplied to a suitable conventional signal decoder 98 as illustrated in FIG. 4. Alternatively, a special purpose receiver/decoder may be utilized to receive and decode command signals broadcast from a central location.

The receiver 96 will receive the usual television signals broadcast by the pay television system operator and may also periodically receive coded command signals to precondition the subscriber's billing control system and read the accumulated data. The coded command signals may be received by the receiver 96 and supplied to the signal decoder 98. The signal decoder 98 decodes the command signal CMD as one of the SEL1–SEL3 signals and initiates operation of the control apparatus 28, the telephone dialing apparatus 30 and the remote terminal 32 as was previously described.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A telephone data accumulator system comprising:
   at least one selectively operable telephone data transmitting device at a remote location, said device including a data accumulator that accumulates data pertaining to services used at the remote location and means for generating a predetermined telephone dialing signal, both connected across nondedicated telephone lines in parallel therewith so as not to interfere with normal service to a telephone connected across said lines;
   line capture means connected across the telephone lines in parallel therewith at the remote location for seizing the telephone lines in preparation for placing a call;
   means at the remote location for selectively conditioning said line capture means and generating means respectively on a time-selected basis to seize the telephone lines and to generate said dialing signals and apply said dialing signals to the telephone lines to thereby initiate a call from the remote location to a central location over the nondedicated telephone lines;

a data utilization device at the central location;

means at the central location for automatically answering the call initiated from the remote location and producing a connection between the remote location and the central location over the telephone lines;

means at the remote location connected to the telephone lines for detecting a go-ahead signal on the telephone lines; and, means responsive to said detected go-ahead signal for transferring data from the data accumulator at the remote location to the utilization device at the central location over the telephone lines connecting said remote location and said central location.

2. The system of claim 1 wherein said time-selected basis is controlled by timing means at the remote location for periodically enabling said generating means at predetermined time intervals and at predetermined times of day when the telephone lines at the remote location are not normally in use so as to initiate a call from the remote location to the central location at said times of day and at said time intervals.

3. The system of claim 1 wherein said generating means includes means for generating a plurality of different, predetermined telephone dialing signals, and said conditioning means includes means for selectively enabling said generating means to generate, at different times, the different telephone dialing signals and to initiate calls from the remote location to different central locations on a periodic basis.

4. The system of claim 1 wherein said conditioning means comprises means for receiving a signal identifying a desired preconditioning function, said line capture means and said generating means being conditioned in response to said received identifying signal.

5. A system for accumulating data at a central station from data accumulators at a plurality of remote locations over nondedicated telephone lines connected to telephone sets at the remote location while minimizing the possibility of interference with normal telephone service to the telephone set comprising:

a selectively operable telephone dialing means and a data accumulator for accumulating data pertaining to billing for services used at the remote location connected to the nondedicated telephone lines at each of the remote locations;

means at each of the remote locations connected to said dialing means for initiating the transmission of a predetermined pattern of sequential, periodic telephone dialing signals over the telephone lines to thereby place a call from the remote location to the central station over the telephone lines;

means for selectively conditioning said initiating means at a time when the telephone set at the remote location is not normally in use in order to effect the transmission of said pattern of telephone dialing signals over the telephone lines and thereby initiate the transmission of telephone ringing signals to the central station;

means at the central station for automatically receiving and answering the telephone ringing signals to place the central station in connection over the nondedicated telephone lines with the remote location initiating said ringing signals;

means at the remote location for detecting the answering of the ringing signals by the central station;

means at the remote location for transferring data from the data accumulator to the central station over the nondedicated telephone lines in response to said detecting means; and, means at the central station for receiving and storing said transferred data.

6. A telephone data accumulating system for collecting billing data from subscribers to a pay television system, the billing data being collected at a central station from each subscriber station over nondedicated telephone lines that provide telephone service to the subscriber station, the system comprising:

a data accumulator for accumulating data pertaining to billing for television programs viewed at each of the subscriber stations;

means including automatic dialing signal generating means at each of the subscriber stations connected to said nondedicated telephone lines for initiating telephone connection of the subscriber station to the central station over the nondedicated telephone lines;

means for selectively conditioning said initiating means on a selection basis that is time determinable in order to effect the connection of the subscriber station to the central station over the nondedicated telephone lines while minimizing the possibility of interference with normal telephone service to the subscriber station;

means at the subscriber station for effecting the transfer of data from the data accumulator to the central station over the connection made between the stations on the nondedicated telephone lines;

means at the central station for receiving and storing said transferred data.

* * * * *